US007020128B1

(12) United States Patent
Gladden et al.

(10) Patent No.: US 7,020,128 B1
(45) Date of Patent: Mar. 28, 2006

(54) SYSTEM AND METHOD FOR DATAGRAM STAGGERING IN A COMMUNICATION SYSTEM

(75) Inventors: Mark A. Gladden, Lewisville, TX (US); Neill R. Bell, Plano, TX (US); Kenneth A. Lauffenburger, Carrollton, TX (US); William A. Perry, Jr., Addison, TX (US); Klaus S. Fosmark, Frisco, TX (US)

(73) Assignee: Efficient Networks, Inc., Dallas, TX (US)

( * ) Notice: Subject to any disclaimer, the term of this patent is extended or adjusted under 35 U.S.C. 154(b) by 911 days.

(21) Appl. No.: 09/705,562

(22) Filed: Nov. 2, 2000

(51) Int. Cl.
*H04L 12/66* (2006.01)

(52) U.S. Cl. ....................... 370/352; 370/442; 375/222

(58) Field of Classification Search ........ 370/352–356, 370/473–474, 395.1, 357, 537, 412, 428, 370/433, 435, 230, 230.1, 235.1, 476, 442, 370/498; 375/222

See application file for complete search history.

(56) References Cited

U.S. PATENT DOCUMENTS

| | | | | |
|---|---|---|---|---|
| 5,805,588 | A * | 9/1998 | Petersen | 370/356 |
| 6,118,763 | A * | 9/2000 | Trumbull | 370/231 |
| 6,480,494 | B1 * | 11/2002 | Hawley | 370/395.61 |
| 6,717,955 | B1 * | 4/2004 | Holler | 370/474 |
| 6,834,057 | B1 * | 12/2004 | Rabenko et al. | 370/468 |

* cited by examiner

*Primary Examiner*—Ricky Ngo
*Assistant Examiner*—Nittaya Juntima
(74) *Attorney, Agent, or Firm*—Baker Botts L.L.P.

(57) ABSTRACT

In one aspect of the invention, a method for datagram staggering in a communication system includes receiving samples of a first input signal and a second input signal. The first input signal corresponds to a first communication device, and the second input signal corresponds to a second communication device. The method also includes generating a first plurality of datagrams containing at least a portion of the samples of the first input signal. In addition, the method includes generating a second datagram containing at least a portion of the samples of the second input signal. The second datagram is staggered from each of the first plurality of datagrams such that the second datagram is ready for communication at a different time than any of the first plurality of datagrams.

3 Claims, 6 Drawing Sheets

SYSTEM AND METHOD FOR DATAGRAM STAGGERING IN A COMMUNICATION SYSTEM

TECHNICAL FIELD OF THE INVENTION

This invention relates generally to communication systems, and more particularly to a system and method for datagram staggering in a communication system.

BACKGROUND OF THE INVENTION

Packet-switched protocols allow information to be communicated between elements in a network within datagrams, or units of information. The datagrams could, for example, take the form of Internet Protocol (IP) packets, Asynchronous Transfer Mode (ATM) cells, or Frame Relay packets. The information being transported across the network is typically divided into multiple datagrams, and each datagram is communicated over the network. The network element receiving the datagrams removes the information from the datagrams and reassembles the information.

In a similar manner, packet-switched protocols may be used to transport voice or other analog information across a network. To transport voice information, a voice signal may be sampled, where digital values representing the voice signal are generated. The resulting digital values are placed into datagrams, and the datagrams are communicated across the network. A network element receives the datagrams and reassembles the digital information. The network element may then reconvert the digital information back into an analog signal, or the network element may process and deliver the digital signal to an interface device.

A modem is typically used to communicate datagrams containing voice or other information across the network. The modem often may be coupled to multiple communication devices, such as telephones, facsimile machines, and answering machines. A problem with prior communication systems is that the use of multiple communication devices often causes delays in the transmission of information across the network. When multiple communication devices are in use, datagrams may be generated for each of the communication devices. The datagrams of multiple devices may be generated and become ready for transmission at the same time.

To communicate the datagrams across the network, the modem typically places at least some of the datagrams in a queue. The datagrams placed in the queue are not communicated across the network until some time has elapsed. This increases latency in the system by delaying the communication of the datagrams across the network. Also, multiple datagrams are usually generated for each communication device, and each datagram may be placed in a queue before transmission. This also increases latency in the system because multiple datagrams for each communication device may be delayed.

The increased latency in the system may adversely affect applications in the system, such as interfering with the communication of voice information across a network. For example, during a telephone conversation, the latency of the system slows the communication of datagrams containing voice information. The system takes a longer amount of time to communicate the datagrams from one end of the conversation to the other end of the conversation. As a result, the people engaging in the conversation may have difficulty speaking to one another because of this delay in the system. For example, the people may start speaking at the same time and over one another, making it difficult for each person to understand what the other is saying.

SUMMARY OF THE INVENTION

The present invention recognizes a need for a system and method for datagram staggering in a communication system, which reduce or eliminate some or all of the problems and disadvantages associated with prior systems and methods.

In one embodiment of the invention, a modem includes a memory operable to receive and store at least a portion of samples of a first input signal and a second input signal. The first input signal corresponds to a first communication device, and the second input signal corresponds to a second communication device. The modem also includes a processor coupled to the memory. The processor is operable to receive the samples from the memory, generate a first plurality of datagrams containing at least a portion of the samples of the first input signal, and generate a second datagram containing at least a portion of the samples of the second input signal. The second datagram is staggered from each of the first plurality of datagrams such that the second datagram is ready for communication at a different time than any of the first plurality of datagrams.

In another embodiment of the invention, a method for datagram staggering in a communication system includes receiving samples of a first input signal and a second input signal. The first input signal corresponds to a first communication device, and the second input signal corresponds to a second communication device. The method also includes generating a first plurality of datagrams containing at least a portion of the samples of the first input signal. In addition, the method includes generating a second datagram containing at least a portion of the samples of the second input signal. The second datagram is staggered from each of the first plurality of datagrams such that the second datagram is ready for communication at a different time than any of the first plurality of datagrams.

Numerous technical advantages can be gained through various embodiments of the invention. Various embodiments of the invention may exhibit none, some, or all of the following advantages. For example, in one embodiment of the invention, a system is provided that generates datagrams containing information from multiple communication devices. The system also staggers the datagrams so that at least one of the datagrams for one communication device becomes ready for transmission at a different time than datagrams for another communication device. In a particular embodiment, each datagram in the system becomes ready for communication at a different time. This allows the system to communicate at least a portion of a datagram for one communication device toward a network while datagrams for other communication devices are being generated. This helps to reduce or eliminate the need for the system to place a datagram in a queue. This also helps to reduce or eliminate the latency in communicating a datagram toward the network.

Some embodiments of the invention also reduce or eliminate the adverse effects of latency on applications in the system. For example, the decreased latency in the system may help to reduce or eliminate the delay in communicating datagrams that contain voice information toward a network. By reducing or eliminating the delay in communicating the datagrams toward a network, the system may transport datagrams containing voice information from one end of a conversation to the other end of the conversation in a smaller amount of time. As a result, the people engaging in the conversation may have less difficulty in speaking to and understanding one another.

Other technical advantages will be readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
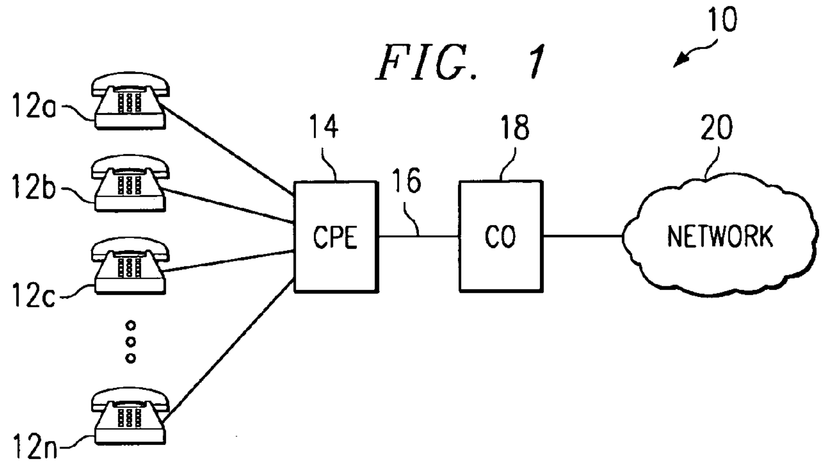
FIG. 1 is a block diagram illustrating an exemplary communication system constructed according to the teachings of the present invention.

FIG. 1 is a block diagram illustrating an exemplary communication system 10 constructed according to the teachings of the present invention. In the illustrated embodiment, system 10 includes a plurality of communication devices 12*a*–12*n*, customer premises equipment (CPE) 14, a communication link 16, a central office 18, and a network 20. Other embodiments of system 10 may be used without departing from the scope of the present invention.

In general, customer premises equipment 14 receives input signals from one or more communication devices 12. Communication devices 12 may be analog or digital devices. For analog devices 12, customer premises equipment 14 samples the input signals and generates digital values representing the input signals. For digital devices 12, customer premises equipment 14 may receive samples generated by the device 12, or customer premises equipment 14 may receive and sample a digital bit stream. Customer premises equipment 14 generates or receives samples from communication device 12, generates a datagram containing the digital information, and communicates the datagram toward network 20.

To reduce or eliminate the delay in communicating the datagrams to central office 18, customer premises equipment 14 staggers the completion of at least a portion of the datagrams. A datagram for one communication device 12 may become ready for communication at a different time than datagrams for other communication devices 12. Customer premises equipment 14 may then communicate the prepared datagram toward network 20 while the other datagrams are being generated. In a particular embodiment, a datagram for one communication device 12 may become ready for communication at or near the time that a datagram for another communication device 12 is communicated toward network 20. This helps to reduce or eliminate the need to place datagrams in a queue, which helps to reduce or eliminate the latency in communicating the datagrams toward network 20.

Communication device 12 is coupled to customer premises equipment 14. In this document, the term "couple" refers to any direct or indirect communication between two or more elements in system 10, whether or not those elements are in physical contact with one another. Communication device 12 is operable to communicate an input signal to customer premises equipment 14. Communication device 12 may comprise any hardware; software, firmware, or combination thereof operable to communicate analog or digital input signals to customer premises equipment 14. In one embodiment, communication device 12 comprises a telephone. Communication device 12 could also comprise an answering machine, a facsimile machine, a satellite dish, a personal television receiver, a computer, or any other suitable analog or digital device operable to communicate with customer premises equipment 14.

In one embodiment, a communication device 12 may operate in an "active" state or an "inactive" state. In this document, the term "active" refers to operating in a state where information is transmitted and/or received by a communication device 12, and "inactive" refers to operating in a state where information is not transmitted or received by a communication device 12. For example, a telephone may be active when sending or receiving a telephone call, and a facsimile machine may be active when transmitting or receiving facsimile traffic over communication link 16.

Customer premises equipment 14 is coupled to communication devices 12 and communication link 16. Customer premises equipment 14 receives input signals from communication devices 12. Where communication device 12 is an analog device, customer premises equipment 14 samples the input signals to generate digital values. Where communication device 12 is a digital device, customer premises equipment 14 may receive digital values from the device 12, or customer premises equipment 14 may receive a digital bit stream, sample the bit stream, and generate the digital values. After generating or receiving a predetermined number of samples, customer premises equipment 14 generates a datagram containing the samples. The datagram may comprise any suitable packet-switched datagram, such as an ATM cell or a Frame Relay packet. After generating or receiving the datagram, customer premises equipment 14 communicates the datagram toward network 20.

To reduce or eliminate the latency in communicating the datagrams toward network 20, customer premises equipment 14 may stagger at least a portion of the datagrams. In this document, the term "stagger" refers to at least two datagrams becoming ready for communication at different times. For example, a datagram corresponding to one communication device 12 may become ready for transmission at a different time than datagrams corresponding to other communication devices 12. Customer premises equipment 14 may then communicate the prepared datagram toward network 20 while other datagrams are still being generated. Customer premises equipment 14 may comprise any hardware, software, firmware, or combination thereof operable to receive input signals from communication devices 12 and communicate datagrams toward network 20. One embodiment of customer premises equipment 14 is shown in FIG. 2, which is described below.

Communication link 16 couples customer premises equipment 14 to central office 18. Communication link 16 facilitates communication between customer premises equipment 14 and central office 18. Communication link 16 may comprise any communications medium operable to facilitate communication of analog and/or digital signals using ground-based and/or space-based components. Communication link 16 may, for example, comprise a twisted-pair copper telephone line, a fiber optic line, or a wireless link between customer premises equipment 14 and central office 18. In a particular embodiment, communication link 16 comprises an Asynchronous Transfer Mode (ATM) or a Frame Relay communication medium. Other embodiments of communication link 16 may be used without departing from the scope of the invention.

In this example, central office 18 is coupled to customer premises equipment 14 and to network 20. Central office 18 facilitates communication between customer premises equipment 14 and network 20. Network 20 may include any suitable wireline or wireless system that supports communication between network elements using ground-based and/or space-based components. For example, network 20 may be a public switched telephone network (PSTN), an integrated services digital network (ISDN), a local area networks (LAN), a wide area network (WAN), a global computer network such as the Internet, or any other communications system or systems at one or more locations.

Figure 2:
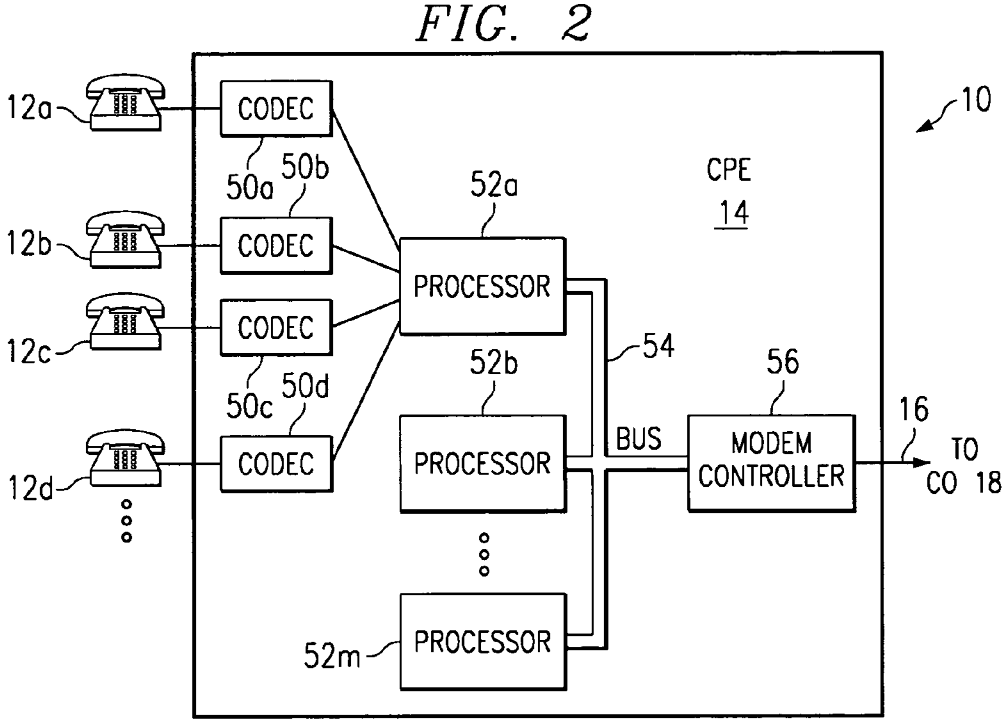
FIG. 2 is a block diagram illustrating exemplary customer premises equipment constructed according to the teachings of the present invention.

FIG. 2 is a block diagram illustrating exemplary customer premises equipment 14 constructed according to the teachings of the present invention. In the illustrated embodiment, customer premises equipment 14 includes a plurality of coding/decoding modules (CODECs) 50*a*–50*d*, a plurality of processors 52*a*–52*m*, a bus 54, and a modem controller 56. Other embodiments of customer premises equipment 14 may be used without departing from the scope of the present invention.

CODEC 50 is coupled to a communication device 12 and to a processor 52. CODEC 50 can receive an analog input signal from communication device 12 and convert the analog signal into a digital signal or bit stream containing digital representations of the analog signal. CODEC 50 can also receive digital signals from processor 52 and convert the digital signals into analog signals. CODEC 50 may comprise any hardware, software, firmware, or combination thereof operable to convert analog signals to digital signals and digital signals to analog signals. Although FIG. 2 illustrates customer premises equipment 14 as comprising one CODEC 50 for each communication device 12, other embodiments may be used without departing from the scope of the present invention. For example, a CODEC 50 may be placed in communication device 12. Also, communication device 12 may comprise a digital device operable to communicate using digital signals, and a CODEC 50 may not be needed for this device 12.

Processor 52 is coupled to CODECs 50 and bus 54. Processor 52 receives a bit stream from CODEC 50, which represents the analog input signal received by that CODEC 50. Processor 52 also samples the bit stream. The sample may, for example, comprise the digital representation of the input signal at a specific time. In one embodiment, processor 52 collects a sample of the input signal every 125 microseconds. Processor 52 further communicates the collected samples to modem controller 56 over bus 54. Processor 52 may comprise any hardware, software, firmware, or combination thereof operable to sample an input signal. In one embodiment, processor 52 comprises a digital signal processor.

Processor 52 may perform additional functions in system 10. In one embodiment, processor 52 performs echo cancellation. In another embodiment, processor 52 can compress and/or decompress the samples of the input signals. Processor 52 may use any compression algorithm in compressing the samples, including Pulse Code Modulation (PCM), 16 kilobits-per-second Adaptive Differential Pulse Code Modulation (ADPCM16), and 32 kilobits-per-second Adaptive Differential Pulse Code Modulation (ADPCM32). In addition, processor 52 may use different compression algorithms on different input signals. For example, processor 52*a* could perform PCM compression on the samples from device 12*a* and 32 kilobits-per-second ADPCM compression on the samples from device 12*b*.

Bus 54 couples processors 52 and modem controller 56. Bus 54 facilitates communication between processors 52 and modem controller 56. Bus 54 may, for example, transport samples of an input signal generated by processor 52 to modem controller 56. In one embodiment, bus 54 allows processors 52 and modem controller 56 to communicate over a plurality of communication channels. In a particular embodiment, each channel carries samples of one input signal from one communication device 12. Bus 54 may comprise any suitable hardware, software, firmware, or combination thereof operable to facilitate communication between processors 52 and modem controller 56. In one embodiment, communication over bus 54 may be divided into a plurality of windows, where each channel uses one of the windows. In a particular embodiment, bus 54 comprises a Time Division Multiplexing (TDM) bus, where the windows of bus 54 comprise time slots. Other embodiments of bus 54 may be used without departing from the scope of the present invention.

Modem controller 56 is coupled to bus 54 and communication link 16. Modem controller 56 provides an interface between customer premises equipment 14 and network 20. For example, modem controller 56 receives samples of the input signals over bus 54. Modem controller 56 also generates a datagram containing samples of one of the input signals and communicates the datagram toward network 20 over communication link 16. The datagram may comprise any suitable packet-switched datagram. In one embodiment, the datagram comprises an ATM cell containing a predetermined number of samples, such as forty-four samples of an input signal. Modem controller 56 may comprise any hardware, software, firmware, or combination thereof operable to facilitate communication between customer premises equipment 14 and network 20. Modem controller 56 may, for example, comprise a digital subscriber line (DSL) modem, a cable modem, or any other suitable communication device.

To reduce or eliminate the latency in communicating the datagrams toward network 20, modem controller 56 staggers at least a portion of the datagrams. A datagram corresponding to one communication device 12 may become ready for transmission at a different time than datagrams corresponding to other communication devices 12. In one embodiment, each datagram becomes ready for transmission at a different time. Modem controller 56 may communicate the prepared datagram toward network 20 at or near the same time that modem controller 56 is generating the other datagrams. This helps to reduce or eliminate the latency in communicating the datagrams toward network 20. One embodiment of modem controller 56 is shown in FIG. 3, which is described below.

Although FIG. 2 illustrates one embodiment of customer premises equipment 14, other embodiments may be used without departing from the scope of the present invention. For example, although FIG. 2 illustrates multiple processors 52, system 10 may include any number of processors in customer premises equipment 14. Also, although FIG. 2 illustrates one processor 52 coupled to four communication devices 12, each processor 52 may be coupled to any number of communication devices 12. Further, CODECs 50, processors 52, and modem controller 56 could reside on one or multiple chips in system 10. In addition, the functionality of CODECs 50, processors 52, and modem controller 56 could be combined into one or more elements in system 10. Other changes may be made to customer premises equipment 14 without departing from the scope of the present invention.

Figure 3:
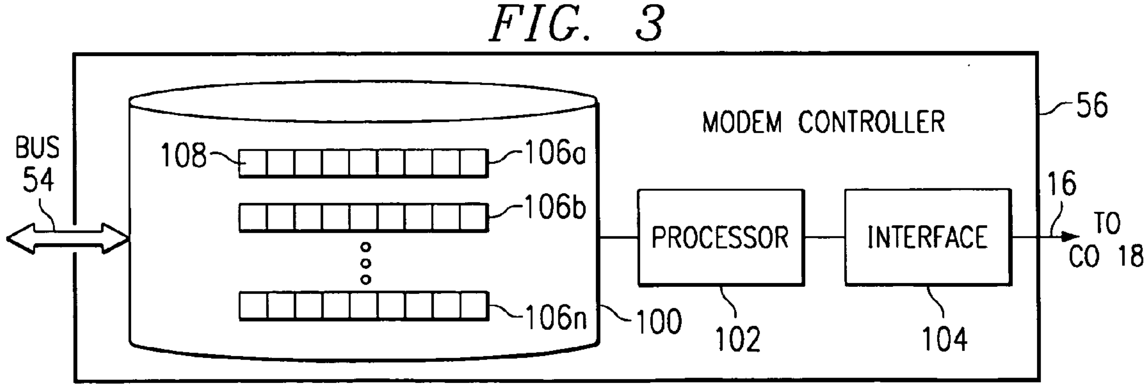
FIG. 3 is a block diagram illustrating an exemplary modem controller constructed according to the teachings of the present invention.

FIG. 3 is a block diagram illustrating an exemplary modem controller 56 constructed according to the teachings of the present invention. In the illustrated embodiment, modem controller 56 includes a memory 100, a processor 102, and an interface 104. Other embodiments of modem controller 56 may be used without departing from the scope of the present invention.

Memory 100 communicates with processors 52 over bus 54. Memory 100 receives and stores the samples of the input signals produced by processors 52 and/or communication devices 12. Memory 100 also facilitates retrieval of the samples by processor 102. Memory 100 may comprise any hardware, software, firmware, or combination thereof operable to store and facilitate retrieval of information. In the illustrated embodiment, memory 100 comprises a plurality of buffers 106, where each buffer includes a plurality of entries 108. Buffers 106 may comprise separate memory structures in modem controller 56, or buffers 106 may comprise logical partitions in the same memory structure. In one embodiment, the size of buffer 106 may be controlled by processor 102. In a particular embodiment, each buffer 106 has a size that is a multiple of four bytes. Other embodiments of memory 100 may be used without departing from the scope of the present invention. Also, although FIG. 3 illustrates memory 100 as residing within modem controller 56, memory 100 may reside in any location accessible to processor 102.

Processor 102 communicates with memory 100 and is coupled to interface 104. Processor 102 is operable to generate datagrams containing the samples stored in memory 100. Processor 102 is also operable to communicate the datagrams toward network 20 through interface 104. Processor 102 may comprise any hardware, software, firmware, or combination thereof operable to generate datagrams containing the samples of the input signals produced by processors 52.

Interface 104 is coupled to processor 102 and to communication link 16. Interface 104 facilitates communication between modem controller 56 and external network elements over communication link 16. Interface 104 may comprise any hardware, software, firmware, or combination thereof operable to facilitate communication over communication link 16. In one embodiment, interface 104 comprises an ATM interface.

In the illustrated embodiment, memory 100 comprises a plurality of buffers 106. In a particular embodiment, each buffer 106 corresponds to a communication channel that may be established over bus 54 to facilitate communication with one of communication devices 12. In this embodiment, each sample received over a channel of bus 54 is stored in the corresponding buffer 106. When a predetermined number of samples have been stored in buffer 106, system 10 generates an interrupt signal, and processor 102 generates a datagram containing the samples from the buffer 106. In one embodiment, system 10 generates an interrupt signal at an approximate time when buffer 106 has received and stored forty-four samples of an input signal. In this embodiment, processor 102 then packetizes the forty-four samples into an ATM cell.

Processor 102 also staggers at least a portion of the datagrams. For example, processor 102 may stagger the datagrams containing samples stored in buffers **106*a* and datagrams containing samples stored in buffer 106*b*. In this example, buffer 106*a* receives the last of a predetermined number of samples at a particular time. Processor 102 then generates a first datagram containing the samples from buffer 106*a* and communicates the first datagram toward network 20. At or near the time processor 102 is generating and/or communicating the first datagram toward network 20, buffer 106*b* receives the last of a predetermined number of samples. Processor 102 may then generate a second datagram containing the samples from buffer 106*b*, and the second datagram becomes ready for communication toward network 20 at a different time than the first datagram. In one embodiment, the second datagram becomes ready for communication at or near the time that modem controller 56 finishes communicating the first datagram toward network 20. In this way, processor 102 may stagger the datagrams, helping to reduce or eliminate the need to place one of the datagrams in a queue. This reduces or eliminates the latency experienced by each datagram communicated toward network 20**.

Processor 102 may use any suitable method for staggering the datagrams in system 10. Processor 102 may, for example, stagger the datagrams in system 10 by delaying initiation of sample collection and/or delaying initiation of generation of datagrams for one or more communication devices 12. For example, if two communication devices 12 are active in system 10, processor 102 may delay the collection of samples for generation of datagrams for the second communication device 12. As a result, datagrams for the second communication device 12 may become ready for communication at different times than datagrams for the first communication device 12.

In one embodiment, processor 102 staggers the datagrams in system 10 by collecting and then discarding samples of an input signal. In this embodiment, processor 102 may establish a communication channel over bus 54 for one of the communication devices 12, such as device **12*c*. When other devices 12 are active in system 10, processor 102 allows a buffer 106, such as buffer 106*b*, to store samples of the input signal from device 12*c*. To stagger the datagrams produced in system 10, processor 102 allows buffer 106*b* to store one or more samples of the input signal from device 12***c*, and then system 10 discards those samples. Processor 102 then allows buffer 106*b* to collect additional samples that will be placed into a datagram. System 10 may "discard" a sample by not placing the sample in a datagram and/or not communicating the sample toward network 20. By collecting and then discarding one or more samples of an input signal from one communication device 12, datagrams for multiple communication devices 12 are generated at different times. Thus, the datagrams in system 10 are staggered. By varying the number of samples discarded and/or the time that the samples are collected, processor 102 can control the amount that it staggers the datagrams in system 10. Additional details of one such method may be found in FIG. 10, which is described below.

Discarding one or more samples to stagger the datagrams may be useful, for example, where some amount of information can be discarded without excessively interfering with communication in system 10. For example, in one embodiment, system 10 may collect sixteen samples of an input signal in approximately two milliseconds. Those two milliseconds may occur at the beginning of a telephone call during the startup and establishment of a connection, such as when a caller picks up a telephone. Discarding two milliseconds of a voice telephone call during the connection setup may not excessively interfere with communication in system 10. As a result, system 10 can collect and discard sixteen samples of an input signal to stagger the datagrams in system 10.

In another embodiment, processor 102 staggers the datagrams in system 10 by delaying the establishment of a communication channel over bus 54, which delays initiation of sample collection in system 10. In this embodiment, processor 102 may establish a communication channel over bus 54 for one of the communication devices 12, such as device 12*f*. When other communication devices 12, such as device 12*c*, are active in system 10, processor 102 delays the establishment of the new channel for device 12*f* using a timer. For example, processor 102 may start the timer when it communicates the next datagram for device 12*c* toward network 20. After the timer elapses, processor 102 establishes a new channel for communication device 12*f*. After establishing the new channel over bus 54, memory 100 receives samples of the input signal from communication device 12*f*, and processor 102 generates datagrams containing those samples. By using a timer to establish the new channel over bus 54, memory 100 starts receiving samples over the new channel at a different time. As a result, datagrams containing the samples of the input signal from device 12*f* are generated at different times than the datagrams generated for device 12*c*. This staggers the communication of the datagrams associated with the two communication devices 12. Additional details of one such method may be found in FIG. 11, which is described below.

Figure 4A:
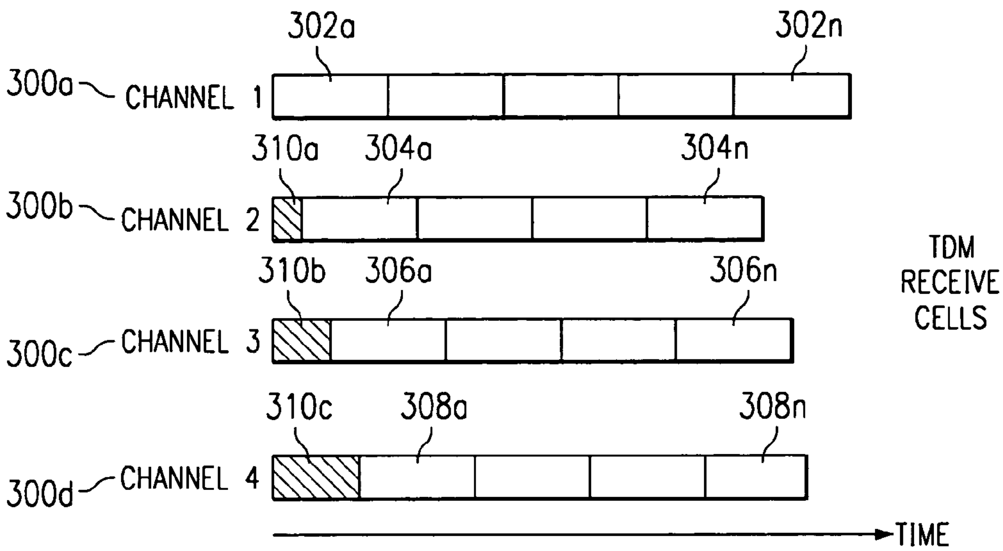
FIGS. 4*a* and 4*b* are timing diagrams illustrating exemplary reception and communication of information according to the teachings of the present invention.
Figure 4B:
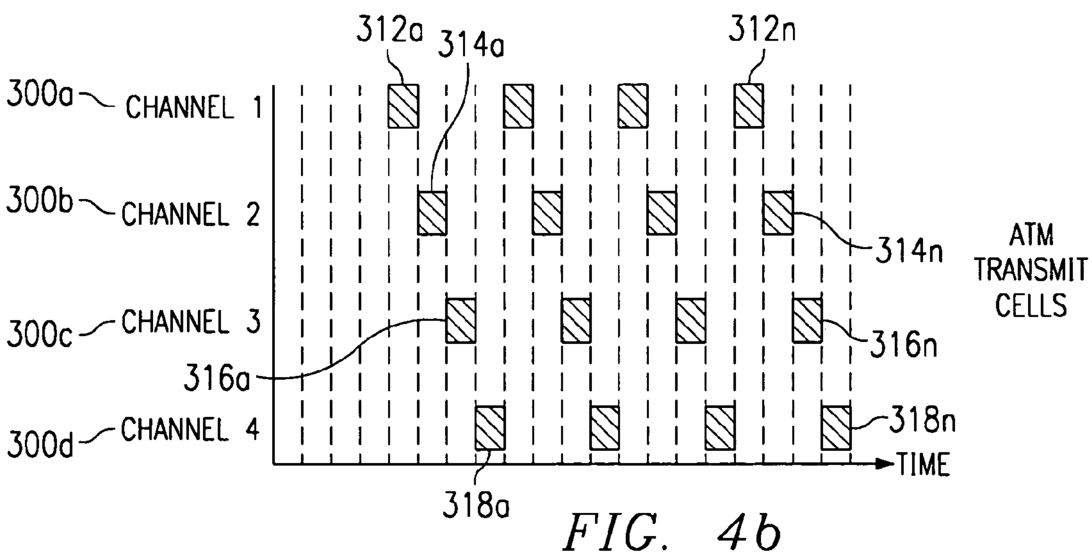

FIGS. 4*a* and 4*b* are timing diagrams illustrating exemplary reception and communication of information according to the teachings of the present invention. FIG. 4*a* is a timing diagram illustrating exemplary reception of information by modem controller 56 from processors 52 over bus 54. FIG. 4*b* is a timing diagram illustrating exemplary communication of datagrams containing the information received by modem controller 56. The timing of the reception and communication of information by modem controller 56 in FIGS. 4*a* and 4*b* is for illustration only. Also, although only four channels are illustrated in FIGS. 4*a* and 4*b*, the same or similar timing may occur with respect to any number of channels in system 10. In addition, the numbering of the channels in FIGS. 4*a* and 4*b* are for illustration only. The same or similar timing may occur with respect to any group of channels in system 10, whether or not those channels are sequential or nonsequential.

In FIG. 4*a*, modem controller 56 receives samples of input signals over four communication channels 300. For channel 300*a*, modem controller 56 receives samples during time blocks 302. Each time block 302 represents the time needed for modem controller 56 to collect enough samples to fill a buffer 106 for generation of one datagram. In one embodiment, modem controller 56 collects forty-four samples of an input signal during each time block 302, and modem controller 56 generates an ATM cell containing the samples. Similarly, modem controller 56 may receive a predetermined number of samples over channel 300*b* during each time block 304, a predetermined number of samples over channel 300*c* during each time block 306, and a predetermined number of samples over channel 300*d* during each time block 308.

In order to stagger the datagrams containing the samples collected in time blocks 302–308, system 10 can delay the initiation of sample collection for datagrams and/or generation of datagrams containing the samples received over channels 300*b*–300*d*. For channel 300*b*, system 10 introduces a delay time 310*a*. For channels 300*c* and 300*d*, system 10 introduces delay times 310*b* and 310*c*, respectively. As shown in FIG. 4*a*, the delay time 310 changes the time that time blocks 304–308 are completed, using channel 300*a* as a reference.

System 10 may determine any suitable duration for delay times 310. In one embodiment, the duration of delay time 310 depends on the communication time of a datagram toward network 20. In this document, the phrase "communication time" refers to the time it takes modem controller 56 to communicate information toward network 20. For example, in a particular embodiment, delay time 310*a* is approximately equal to the time it takes modem controller 56 to communicate one datagram toward network 20. Delay time 310*b* is approximately equal to the time it takes modem controller 56 to communicate two datagrams toward network 20. Delay time 310*c* is approximately equal to the time it takes modem controller 56 to communicate three datagrams toward network 20. Other durations for delay times 310*a*–310*c* may be used without departing from the scope of the present invention.

By using delay times 310, at least a portion of the datagrams containing the samples collected during time blocks 302–308 may be generated and/or communicated toward network 20 at different times. This is shown in FIG. 4*b*, which illustrates modem controller 56 communicating datagrams 312–318 containing the collected samples over link 16. Datagrams 312 contain the samples received over channel 300*a*, datagrams 314 contain the samples received over channel 300*b*, datagrams 316 contain the samples received over channel 300*c*, and datagrams 318 contain the samples received over channel 300*d*. As illustrated in FIG. 4*b*, datagram 312*a* is completed and communicated toward network 20 while datagrams 314*a*–318*a* are being generated. Similarly, datagram 314*a* is completed and communicated toward network 20 while datagrams 316*a*, 318*a*, and 312*b* are being generated. By staggering the datagrams, one datagram may be completed and communicated toward network 20 while other datagrams are being generated. This reduces or eliminates the need to place a datagram in a queue while another datagram is being communicated toward network 20.

As shown in FIG. 4*b*, the use of delay times 310 helps to decrease or eliminate latency in system 10. Datagrams 312–318 are communicated toward network 20 at or near the time that datagrams 312–318 are generated. This helps to reduce or eliminate the need to place datagrams 312–318 in a queue. Because the flow of datagrams 312–318 may also remain relatively constant in system 10, this also helps to make any latency remaining in system 10 relatively constant over time. Each datagram 312–318 may experience a similar amount of latency.

System 10 may use any suitable method to delay the initiation of sample collection and/or the generation of a datagram by a delay time 310. In one embodiment, system 10 collects samples of an input signal during the delay time 310, and then system 10 discards the collected samples. In another embodiment, system 10 sets a timer equal to the delay time, and then system 10 establishes a channel 300 after the timer elapses. Other methods may be used to stagger the datagrams in system 10 without departing from the scope of the present invention.

Figure 5A:
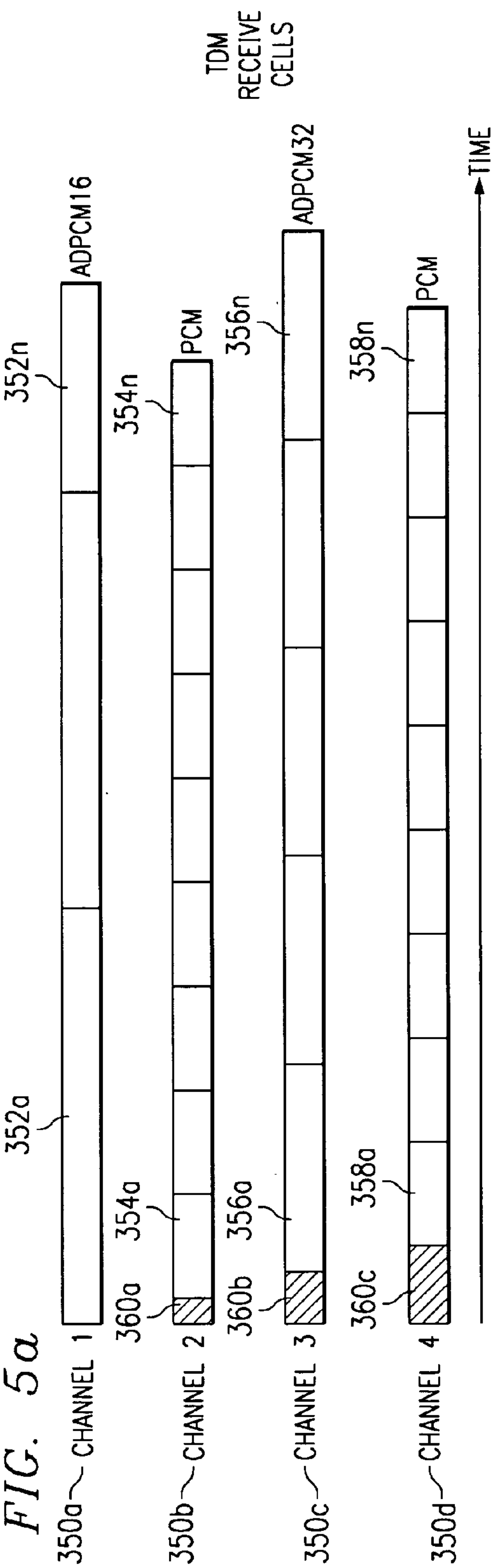
FIGS. 5*a* and 5*b* are timing diagrams illustrating another exemplary reception and communication of information according to the teachings of the present invention.
Figure 5B:
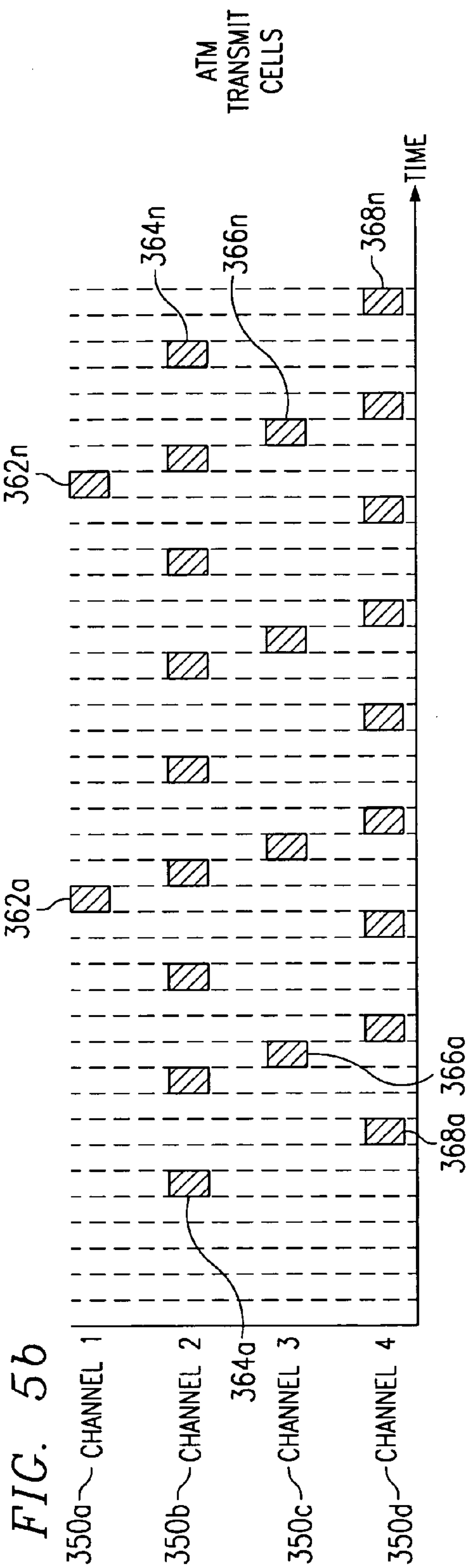

FIGS. 5*a* and 5*b* are timing diagrams illustrating another exemplary reception and communication of information according to the teachings of the present invention. FIG. 5*a* is a timing diagram illustrating another exemplary reception of information by modem controller 56 from processors 52 over bus 54. FIG. 5*b* is a timing diagram illustrating another exemplary communication of datagrams containing the information received by modem controller 56. The timing of the reception and communication of information by modem controller 56 in FIGS. 5*a* and 5*b* is for illustration only. Also, although only four channels are illustrated in FIGS. 5*a* and 5*b*, the same or similar timing may occur with respect to any number of channels in system 10. In addition, the numbering of the channels in FIGS. 5*a* and 5*b* are for illustration only. The same or similar timing may occur with respect to any group of channels in system 10, whether or not those channels are sequential or nonsequential.

In FIG. 5*a*, modem controller 56 receives samples of input signals over four communication channels 350. Channels 350*a*–350*d* transport a predetermined number of samples during each time block 352–358, respectively. In this embodiment, processors 52 are using different compression methods to encode the samples received over channels 350. Processor 52 is performing 16 kilobits-per-second ADPCM compression to encode samples transported over channel 350*a*, and the same or a different processor 52 is performing 32 kilobits-per-second ADPCM compression to encode samples transported over channel 350*c*. For channels 350*b* and 350*d*, processors 52 are performing PCM compression. Because the size of the samples produced by the different compression methods varies, the time needed to fill a buffer 106 also varies. As a result, as shown in FIG. 5*a*, at least some of the time blocks 352–358 have different durations.

In order to stagger the datagrams that are generated using the samples collected in time blocks 352–358, system 10 can delay the initiation of sample collection for the datagrams and/or generation of datagrams containing the samples received over channels 350*b*–350*d*. For channels 350*b*–350*d*, system 10 introduces delay times 360*a*–360*c*, respectively. As shown in FIG. 5*a*, the delay time 360 helps vary the completion time of blocks 352–358.

As a result, at least a portion of the datagrams containing the samples collected during time blocks 352–358 may be generated and/or communicated toward network 20 at different times. This is shown in FIG. 5*b*, which illustrates modem controller 56 communicating datagrams 362–368 over communication link 16. Datagrams 362–368 contain the samples received over channels 350*a*–350*d*, respectively. As illustrated in FIG. 5*b*, datagram 364*a* is completed and communicated toward network 20 while datagrams 362*a*, 366*a*, and 368*a* are being generated. By staggering the datagrams, one datagram may be completed and communicated toward network 20 while other datagrams are being generated. This reduces or eliminates the need to place a datagram in a queue while another datagram is being communicated toward network 20. This helps to reduce or eliminate the delay experienced by each datagram in being communicated toward network 20.

System 10 may use any suitable method to delay the initiation of sample collection and/or the generation of a datagram by a delay time 360. In one embodiment, system 10 collects samples of an input signal during the delay time 360, and then system 10 discards the collected samples. In another embodiment, system 10 sets a timer to the delay time, and then system 10 establishes a channel 350 after the timer elapses. Other methods may be used to stagger the datagrams in system 10 without departing from the scope of the present invention.

Figure 6:
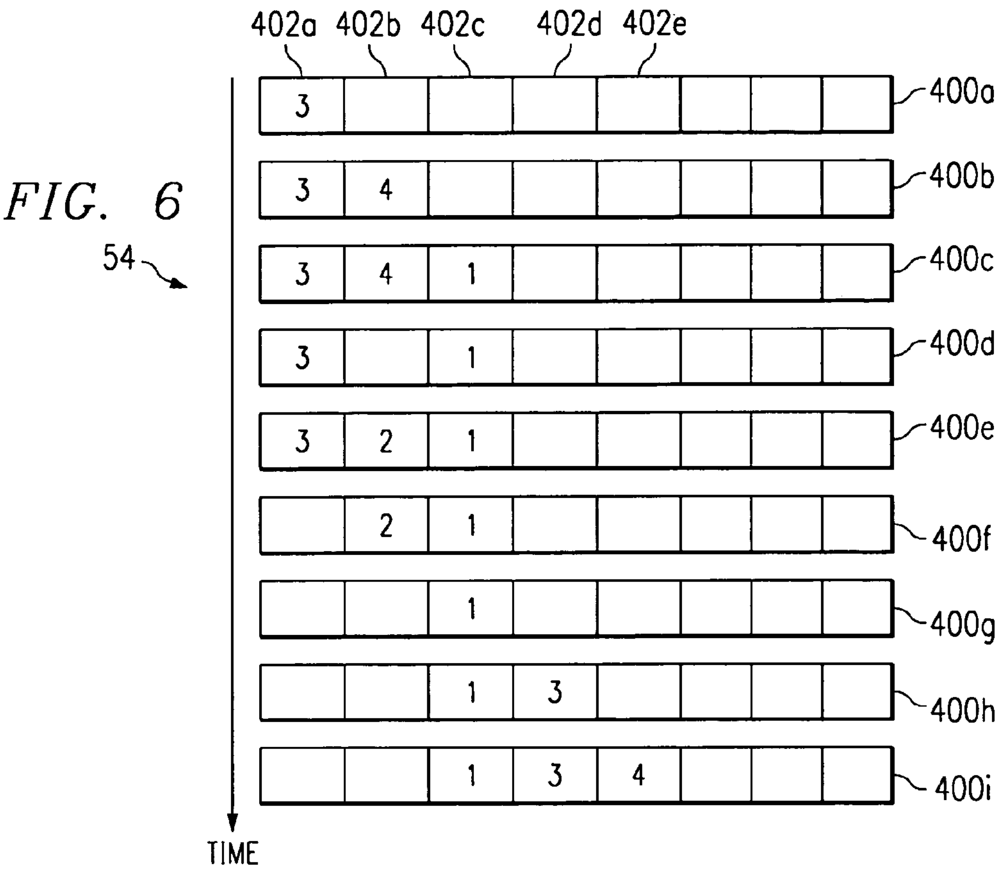
FIG. 6 is a timing diagram illustrating an exemplary assignment of communication channels according to the teachings of the present invention.

FIG. 6 is a timing diagram illustrating an exemplary assignment of communication channels according to the teachings of the present invention. In one embodiment, processors 52 and modem 54 may communicate using communication channels over bus 54. In a particular embodiment, bus 54 comprises a plurality of windows 402, where each window 402 represents a time when samples of an input signal from one communication device 12 may be transported to modem controller 56. The specific channel assignments in FIG. 6 are for illustration only. Channels may be assigned in any order to any communication device 12. Also, the communication devices 12 are labeled with numerals one through four in FIG. 6. Other methods for identifying communication devices 12 may be used without departing from the scope of the present invention.

System 10 may assign communication channels using any suitable method. In a particular embodiment, system 10 assigns the first active channel to window 402*a*. A window 402 assigned to an active channel is referred to as an "occupied" window. After that, the next active channel is assigned to the first unoccupied window that follows an occupied window. A window 402 not assigned to an active channel may be referred to as an "available" window.

In FIG. 6, at time 400*a*, the third communication device 12 becomes active. Because the third communication device 12 is the only active device 12, system 10 assigns the communication channel for the third communication device 12 to window 402*a*. At times 400*b* and 400*c*, respectively, the fourth and first communication devices 12 become active. System 10 assigns the communication channels for the fourth and first communication devices 12 to windows 402*b* and 402*c*, respectively, because those windows 402*b* and 402*c* are the first available windows following an occupied window 402*a*.

At time 400*d*, the fourth communication device 12 becomes inactive, and window 402*b* becomes an available window. At time 400*e*, the second communication device 12 becomes active. System 10 assigns the communication channel for the second communication device 12 to window 402*b* because window 402*b* is the first available window following an occupied window 402*a*.

At times 400*f* and 400*g*, respectively, the third and second communication devices 12 become inactive, so windows 402*a* and 402*b* become available. At times 400*h* and 400*i*, respectively, the third and fourth communication devices 12 become active. System 10 assigns the communication channels for the third and second communication devices 12 to window 402_d_ and 402_e_, respectively, because those windows 402_d_ and 402_e_ are the first available windows following an occupied window 402_c_.

Figure 7:
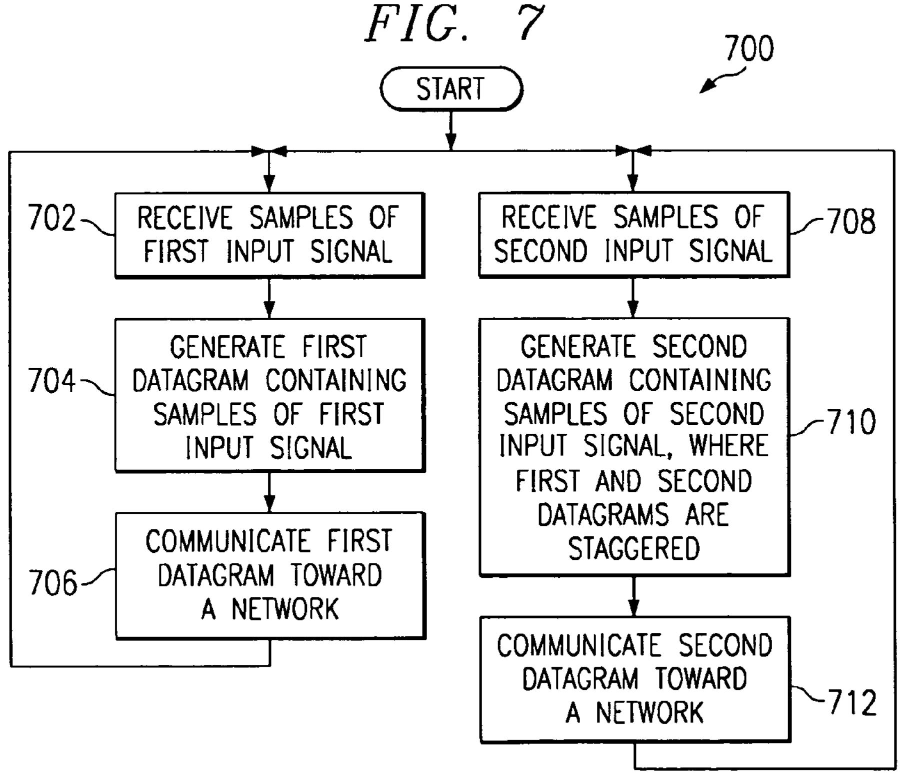
FIG. 7 is a flow diagram illustrating an exemplary method for communicating information toward a network according to the teachings of the present invention.

FIG. 7 is a flow diagram illustrating an exemplary method 700 for communicating information toward a network according to the teachings of the present invention. Method 700 is described as it relates to processing information from two communication devices 12. However, the same or similar method may be used to process information from any number of communication devices 12.

System 10 receives a first input signal from a first communication device 12 at step 702. This may include, for example, a CODEC 50 receiving an analog input signal and producing a digital bit stream. This may also include a processor 52 sampling the digital bit stream at different times and communicating the samples to modem controller 56 over bus 54. System 10 generates a first datagram containing the samples of the first input signal at step 704. This may include, for example, modem controller 56 storing the samples in memory 100 and generating a datagram at or near the time when a predetermined number of samples have been received. System 10 communicates the first datagram toward network 20 at step 706. This may include, for example, modem controller 56 communicating the datagram to central office 18 over communication link 16. System 10 returns to step 702 to receive additional samples of the first input signal.

At or near the time that system 10 is receiving samples of the first input signal and generating the first datagrams, system 10 receives a second input signal from a second communication device 12 at step 708. This may include a CODEC 50 receiving the second analog input signal and a processor 52 sampling the digital bit stream produced by CODEC 50.

System 10 generates a second datagram containing the samples of the second input signal, where the first and second datagrams are staggered, at step 710. This may include, for example, modem controller 56 storing the samples and generating a datagram at or near the time when a predetermined number of samples have been received. This may also include processor 102 in modem controller 56 discarding some of the samples of the second input signal or setting a timer to stagger the datagrams. System 10 communicates the second datagram toward network 20 at step 712. This may include, for example, modem controller 56 communicating the datagram to central office 18 over communication link 16. System 10 returns to step 708 to receive additional samples of the second input signal.

Figure 8:
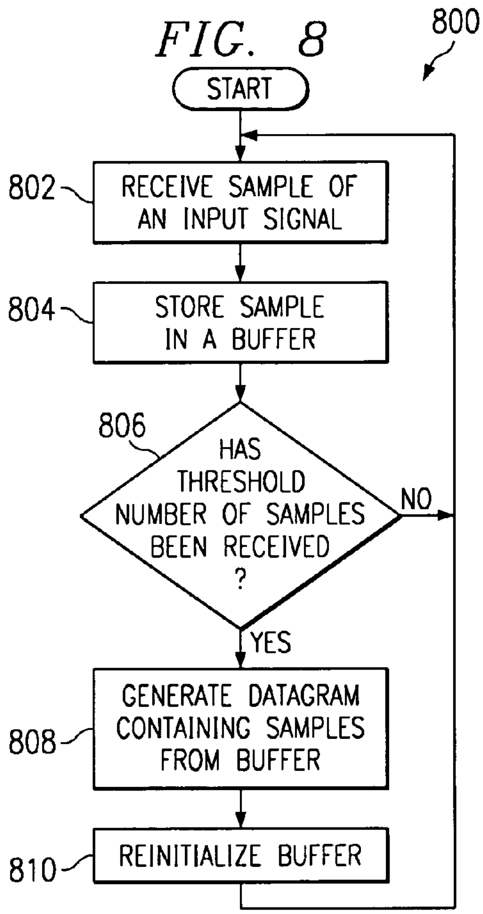
FIG. 8 is a flow diagram illustrating an exemplary method for generating datagrams in a communication system according to the teachings of the present invention.

FIG. 8 is a flow diagram illustrating an exemplary method 800 for generating datagrams in a communication system according to the teachings of the present invention. Method 800 may be used, for example, to generate datagrams containing samples of an input signal from a communication device 12. Other methods for generating datagrams may be used without departing from the scope of the present invention.

System 10 receives a sample of an input signal at step 802. This may include, for example, memory 100 in modem controller 56 receiving the sample over a channel of bus 54. System 10 stores the sample in a buffer 106 at step 804. This may include, for example, memory 100 storing the sample in the buffer 106 that corresponds to the channel of bus 54. System 10 determines whether the buffer 106 is full at step 806. This may include, for example, buffer 106 determining whether a predetermined number of samples have been received.

If the buffer is not full, system 10 returns to step 802 to receive and store another sample of the input signal. If the buffer is full, system 10 generates a datagram containing the samples stored in buffer 106 at step 808. This may include, for example, system 10 generating an interrupt signal. This may also include processor 102 receiving the interrupt signal, packetizing the samples in buffer 106, and adding a header to the datagram. System 10 reinitializes the buffer at step 810. This may include, for example, reinitializing any counters associated with buffer 106 so that the counter shows that no samples are stored in buffer 106. System 10 returns to step 802 to receive and store another sample of the input signal.

Figure 9:
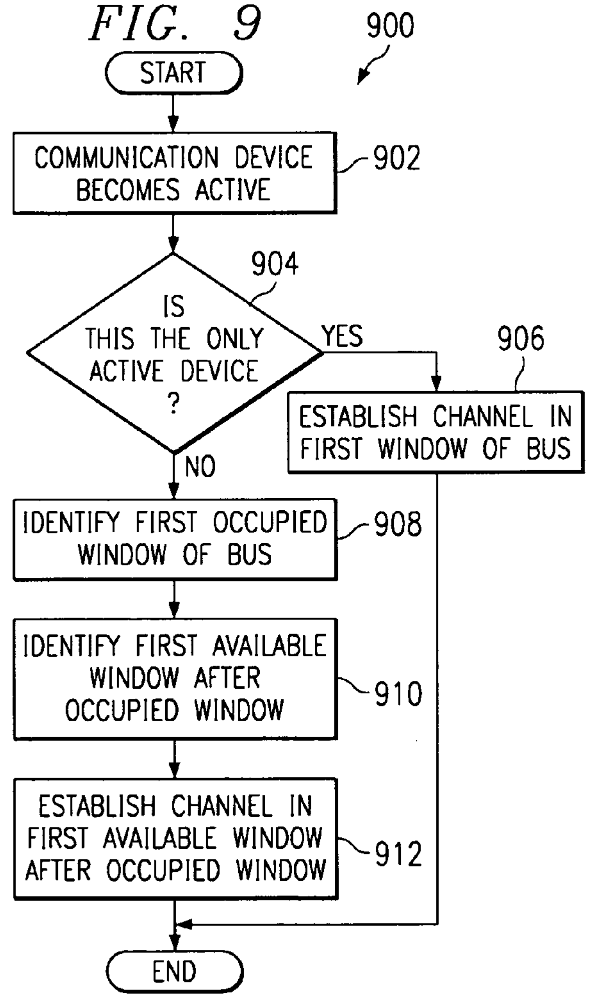
FIG. 9 is a flow diagram illustrating an exemplary method for establishing communication channels in a communication system according to the teachings of the present invention.

FIG. 9 is a flow diagram illustrating an exemplary method 900 for establishing communication channels in a communication system according to the teachings of the present invention. Method 900 may be used, for example, to establish channels over bus 54 in customer premises equipment 14. Other methods for establishing communication channels in customer premises equipment 14 may be used without departing from the scope of the present invention.

A communication device 12 becomes active at step 902. This may include, for example, a telephone going off-hook or a facsimile machine attempting to communicate facsimile traffic toward network 20. Customer premises equipment 14 determines whether this communication device 12 is the only active device 12 at step 904. This may include, for example, processor 102 determining whether any other devices 12 are communicating with customer premises equipment 14.

If the communication device 12 is the only active device, system 10 establishes a first channel between processor 52 and modem controller 56 over bus 54 at step 906. In one embodiment, bus 54 comprises a TDM bus that includes a plurality of windows or time slots, and the first channel uses the first window of bus 54.

If other communication devices 12 are active in system 10 at step 904, other channels of bus 54 are being used to transport samples of input signals from processors 52 to modem controller 56. System 10 identifies the first occupied window that supports an active channel at step 908. System 10 also identifies the first available window that follows the first occupied window at step 908. System 10 establishes a new channel for the new communication device 12 using the first available window following an occupied window at step 912. The new channel may be used to transport samples of the input signal from processor 52 to modem controller 56.

Figure 10:
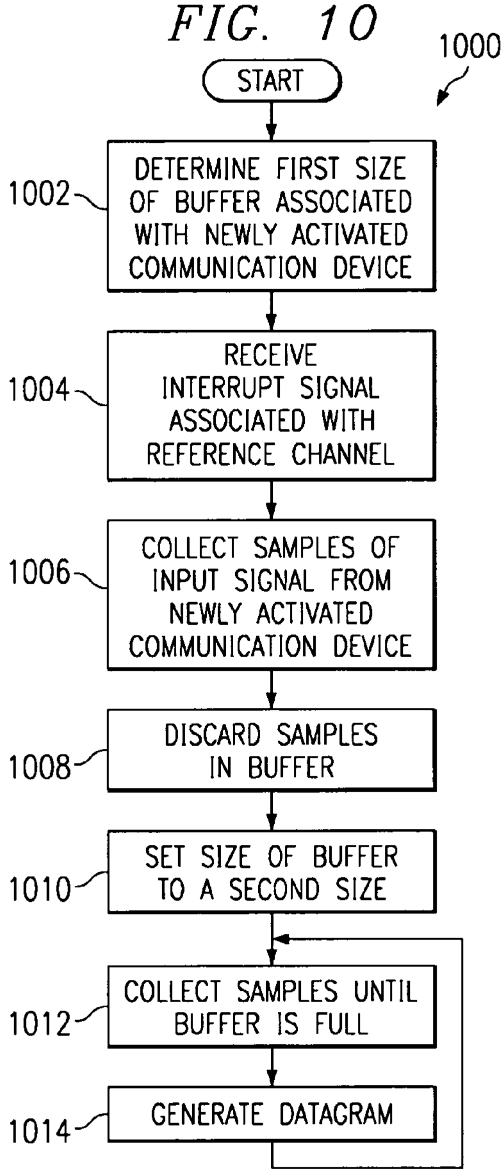
FIG. 10 is a flow diagram illustrating an exemplary method for staggering datagrams in a communication system according to the teachings of the present invention.

FIG. 10 is a flow diagram illustrating an exemplary method 1000 for staggering datagrams in a communication system according to the teachings of the present invention. Processor 102 may perform method 1000, for example, when a communication device 12 becomes active in system 10 and other communication devices 12 are already active.

Processor 102 determines a first size for a buffer 106, such as buffer 106_b_, at step 1002. The buffer 106_b_ may be associated with a newly activated communication device 12. The first size of buffer 106_b_ determines how many samples of an input signal may be collected and later discarded to provide the delay time needed to stagger the datagrams in system 10.

Processor 102 may use any suitable criteria for determining the first size of buffer 106_b_. Factors may include the encoding or compression method used by processor 52 to produce the samples collected by buffer 106_b_, and the rate that data is communicated over communication link 16. The compression algorithm may affect, for example, the size of each sample, which also affects the time needed to fill buffer 106*b*. The rate that data is communicated over link 16 may be used to determine the time needed for modem controller 56 to communicate one datagram over communication link 16.

Another factor may include the relative positions of the new channel and a "reference" channel. In one embodiment, system 10 uses one or more of the channels over bus 54 as a reference channel. The reference channel may be used, for example, to signal when the buffer 106*b* associated with the new channel may begin collecting samples of an input signal from a newly activated device 12. In a particular embodiment, the reference channel may comprise a fixed channel, such as the first channel. In another embodiment, the reference channel may be the first channel preceding the new channel. The position of the new channel with respect to the reference channel determines how great the delay is between communication of a datagram containing samples from the reference channel and communication of a datagram containing samples from the new channel. For example, if the new channel directly follows the reference channel, modem controller 56 may communicate a datagram for the reference channel and then a datagram for the new channel. However, if channels separate the new channel and the reference channel, modem controller 56 may communicate a datagram for the reference channel, one datagram for each intermediate channel, and then a datagram for the new channel. Other factors may be used without departing from the scope of the present invention.

Processor 102 receives an interrupt signal associated with the reference channel at step 1004. The interrupt signal indicates that the buffer 106 associated with the reference channel, such as buffer 106*a*, has collected a predetermined number of samples, and processor 102 may generate a datagram containing those samples. The buffer 106*b* associated with the newly activated device 12 begins collecting samples of the input signal from the newly activated device 12 at step 1006. This may include, for example, receiving the samples over bus 54 and storing the samples.

At or near the time that the buffer 106*b* associated with the newly activated device 12 stores the number of samples to be discarded, an interrupt signal is generated, and processor 102 discards the samples in buffer 106*b* at step 1008. At this point, by collecting and discarding the samples, subsequent datagrams containing the samples collected by buffer 106*b* will be generated at different times than datagrams containing samples from buffer 106*a*. This may allow, for example, datagrams corresponding to two different communication devices 12 to be completed and communicated toward network 20 at different times.

Processor 102 sets the size of buffer 106*b* to a second size at step 1010. For example, if the datagrams communicated over link 16 are ATM cells containing forty-four samples, the second size of buffer 106*b* may be forty-four bytes. Processor 102 then allows buffer 106*b* to collect samples of an input signal at step 1012, and processor 102 generates a datagram containing the samples at step 1014. Modem controller 56 may continue to collect samples and generate datagrams until the communication device 12 using buffer 106*b* becomes inactive.

Figure 11:
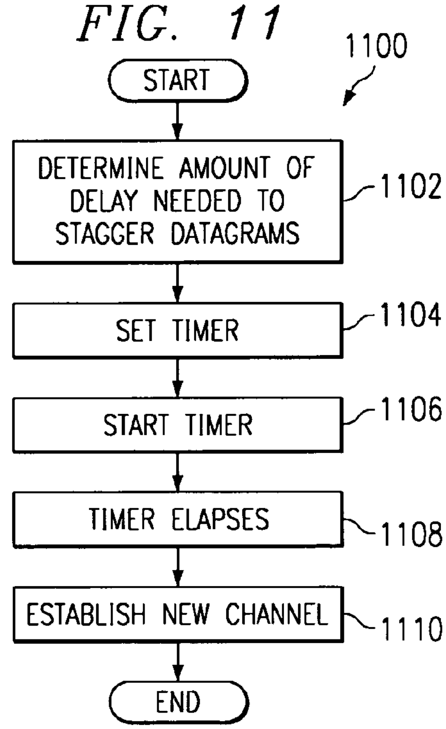
FIG. 11 is a flow diagram illustrating another exemplary method for staggering datagrams in a communication system according to the teachings of the present invention.

FIG. 11 is a flow diagram illustrating another exemplary method 1100 for staggering datagrams in a communication system according to the teachings of the present invention. Processor 102 may perform method 1100, for example, when a communication device 12 becomes active in system 10 and other communication devices 12 are already active.

Processor 102 determines an amount of delay time needed to stagger the datagrams produced for the different communication devices 12 at step 1102. Processor 102 may use any suitable criteria for determining the amount of delay time. In one embodiment, the amount of delay time approximately equals the time needed for modem controller 56 to communicate one datagram over communication link 16. Other methods for determining an amount of delay time may be used without departing from the scope of the present invention.

Processor 102 sets a timer at step 1104. This may include, for example, processor 102 setting the timer to the amount of delay time. Processor 102 starts the timer at step 1106. This may include, for example, processor 102 receiving an interrupt signal associated with a reference channel, such as the preceding channel or any other channel, and starting the timer in response to the signal. The interrupt signal indicates that the buffer 106 associated with the reference channel has collected a predetermined number of samples, and processor 102 may generate a datagram containing those samples. The timer elapses at step 1108. This may include, for example, processor 102 receiving a timer completion interrupt signal. Processor 102 establishes a new channel over bus 54 at step 1110. This may include, for example, processor 102 establishing the new channel in response to the timer completion interrupt signal. By using a timer to establish the new channel over bus 54, modem controller 56 starts receiving samples over the new channel at a different time. As a result, datagrams containing the samples received by modem controller 56 over the new channel are generated at a different time than datagrams associated with the reference channel, thus staggering the communication of the datagrams toward network 20.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for datagram staggering in a communication system, comprising:

receiving samples of a first input signal and a second input signal, the first input signal corresponding to a first communication device, the second input signal corresponding to a second communication device;

generating one of a first plurality of datagrams containing at least a portion of the samples of the first input signal at or near a time when a first threshold number of samples of the first input signal are received; and generating a second datagram containing at least a portion of the samples of the second input signal at or near a time when a second threshold number of samples of the second input signal are received, the second datagram is staggered from each of the first plurality of datagrams such that the second datagram is ready for communication at a different time than any of the first plurality of datagrams, wherein generating the second datagram comprises:

determining a first value for the second threshold number of samples;

receiving a number of samples of the second input signal, the number of samples approximately equal to the first value of the second threshold number;

discarding the received samples; and determining a second value for the second threshold number of samples.

2. A system for datagram staggering in a communication system, comprising:

at least one computer readable medium; and software encoded on the computer readable medium, the software operable when executed to:

receive samples of a first input signal and a second input signal, the first input signal corresponding to a first communication device, the second input signal corresponding to a second communication device;

generate one of a first plurality of datagrams containing at least a portion of the samples of the first input signal at or near a time when a first threshold number of samples of the first input signal are received, and generate a second datagram containing at least a portion of the samples of the second input signal at or near a time when a second threshold number of samples of the second input signal are received, the second datagram is staggered from each of the first plurality of datagrams such that the second datagram is ready for communication at a different time than any of the first plurality of datagrams, wherein the software generates the second datagram by:

determining a first value for the second threshold number of samples;

receiving a number of samples of the second input signal, the number of samples approximately equal to the first value of the second threshold number, discarding the received samples; and determining a second value for the second threshold number of samples.

3. A modem, comprising:

a memory operable to receive and store at least a portion of samples of a first input signal and a second input signal, the first input signal corresponding to a first communication device, the second input signal corresponding to a second communication device; and a processor coupled to the memory, the processor operable to:

receive the samples from the memory;

generate one of a first plurality of datagrams containing at least a portion of the samples of the first input signal at or near a time when a first threshold number of samples of the first input signal are received; and generate a second datagram containing at least a portion of the samples of the second input signal at or near a time when a second threshold number of samples of the second input signal are received, the second datagram is staggered from each of the first plurality of datagrams such that the second datagram is ready for communication at a different time than any of the first plurality of datagrams, wherein the processor generates the second datagram by:

determining a first value for the second threshold number of samples;

receiving a number of samples of the second input signal, the number of samples approximately equal to the first value of the second threshold number;

discarding the received samples; and determining a second value for the second threshold number of samples.

* * * * *